Figure 1:
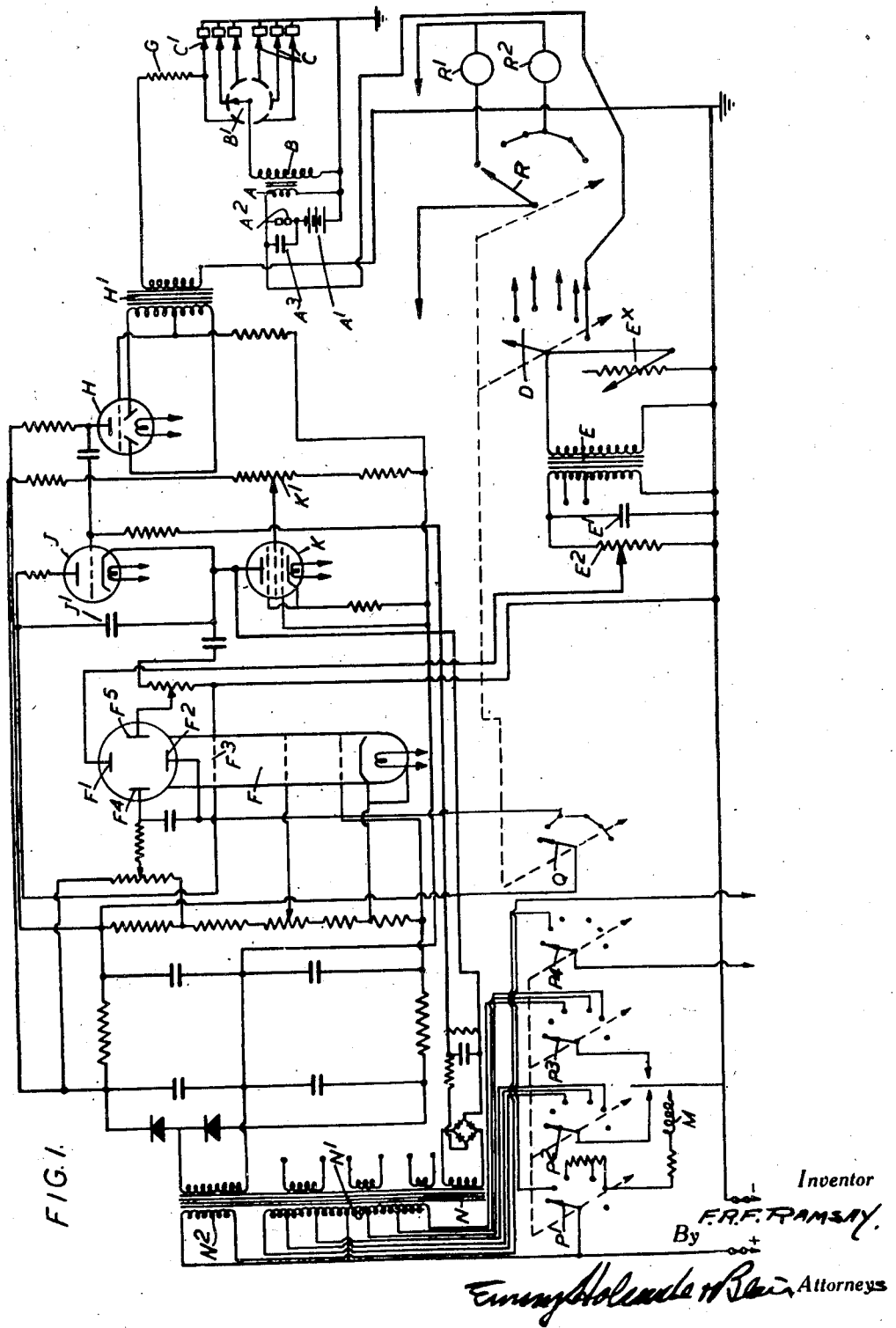

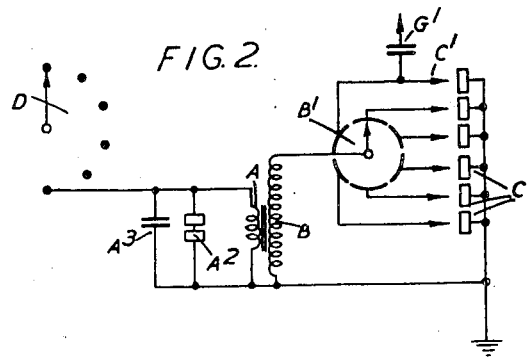
FIG. 2.
FIG. 3.   FIG. 4.   FIG. 5.   FIG. 6. 
FIG. 7.   FIG. 8.   FIG. 9. 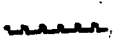  FIG. 10. 
FIG. 11. 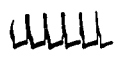  FIG. 12. 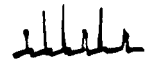
FIG. 13.   FIG. 14. 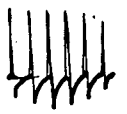  FIG. 15. 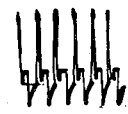  FIG. 16. 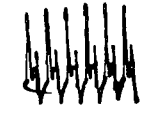

Sept. 28, 1948. F. R. F. RAMSAY 2,450,164
MEANS FOR TESTING ELECTRICAL IGNITION SYSTEMS
OF INTERNAL-COMBUSTION ENGINES
Filed Feb. 1, 1944 3 Sheets-Sheet 3
FIG. 17.   FIG. 18.   FIG. 19.   FIG. 20.
   
FIG. 21.   FIG. 22.   FIG. 23.   FIG. 24.
   
FIG. 25.   FIG. 26.
 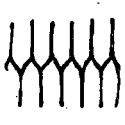
FIG. 27.   FIG. 28.   FIG. 29.   FIG. 30.
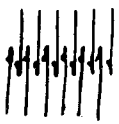   
Inventor
F.R.F. RAMSAY,
By
Attorneys Patented Sept. 28, 1948

2,450,164

UNITED STATES PATENT OFFICE 2,450,164

MEANS FOR TESTING ELECTRICAL IGNITION SYSTEMS OF INTERNAL-COMBUSTION ENGINES

Frank Raymond Faber Ramsay, London, England, assignor to D. Napier & Son Limited, London, England, a company of Great Britain Application February 1, 1944, Serial No. 520,716
In Great Britain February 12, 1943

6 Claims. (Cl. 175—183)

This invention relates to means for testing the ignition systems of internal combustion engines employing spark ignition, and its object is to provide improved means for checking the operation of the ignition system of an internal combustion engine and for detecting faulty sparking plugs or determining the condition of such plugs. The invention finds a particularly useful application in connection with aircraft having several multi-cylinder engines with fully screened dual ignition. Equally an armoured fighting vehicle often has a fully screened multicylinder engine which is by no means readily accessible.

The present applicant's prior United States of America patent specification No. 2,188,845 relates to such apparatus and describes arrangements connected preferably to the primary winding of the ignition apparatus and including a telephone receiver or other high speed indicating device arranged to receive impulses and give indications corresponding to the impulses delivered to the sparking plugs. Such an arrangment enables a user to determine rapidly and easily whether any of the sparking plugs are faulty without having access to any of the screened leads. Preferably, means such as a variable resistance is provided for progressively reducing the intensity of the impulses delivered to the sparking plugs so that it is possible not only to tell whether any plug is failing to function but also to gain some idea of the state of the plug, and what likelihood there is of their failing shortly.

Such apparatus, however, does not indicate which sparking plug is faulty or likely to become faulty and one object of the present invention is to provide testing equipment which not only indicates whether or not certain plugs are faulty, or likely to become so, but also identifies which are the plugs in question.

To this end according to the present invention apparatus for testing ignition systems of internal combustion engines includes an oscillograph, means for connecting the oscillograph to the ignition apparatus so as to receive impulses and give indications corresponding to the impulses delivered to the sparking plugs, and means for synchronising the time base of the oscillograph with the cycle of the engine. For example the time base of the oscillograph may be triggered from an identifiable point in the cycle of the engine.

In one convenient arrangement the time base of the oscillograph is triggered by an electrical impulse corresponding to that supplied to one of the sparking plugs. Alternatively it may be provided by contacts operated mechanically by the engine, preferably so as to be operated once every two revolutions in the case of a four stroke engine. For example, movement of a valve rocker may be arranged to open or close the contacts.

The impulses corresponding to those delivered to the sparking plugs may be derived from the high tension or secondary side of the ignition circuit but preferably they are derived from the low tension or primary side. In the former case the connection will be on the input side of the distributor so that a succession of impulses is received corresponding to those delivered to successive sparking plugs.

One specific embodiment of the invention will now be described by way of example with reference to the accompanying drawings, in which Figure 1 is a circuit diagram of an ignition testing apparatus constructed in accordance with the invention applied to a coil ignition system, Figure 2 is similar to part of Figure 1 showing the application of the apparatus to a magneto ignition system, Figures 3–16 are examples of the type of trace obtained on the oscillograph with various types of fault on a six-cylinder coil ignition system, and Figures 17–30 are similar examples of traces on a twelve-cylinder magneto ignition system.

In the arrangement shown in Figure 1 the apparatus is connected to test any one of a number of coil ignition systems, for example providing dual ignition for the various banks of cylinders of a multi-engined aircraft, only one system being shown for simplicity. The system comprises the usual primary winding A in series with a battery $A^1$ and contact breaker $A^2$ the latter being shunted by a condenser $A^3$, and a secondary winding B connected to the distributor $B^1$ which feeds the sparking plugs C.

Figure 2 shows the corresponding portion of the circuit in the case of magneto ignition in which case there is of course no battery.

The primary impulses representing the impulses delivered to the sparking plugs are communicated to the testing apparatus through a reducing and filter circuit. This comprises a selector switch D for selecting the particular ignition system to be tested. Shunted across the primary winding of the ignition coil selected is a variable resistance $E^x$ having a number of tappings giving, in a particular example, resistances respectively of 18, 22, 28, 34, 48, 67, 76, 169, and 360 ohms and open circuit. By progressively shifting this resistor the impulses delivered to the sparking plugs can be progressively reduced. Also connected across the primary winding of the ignition coil is the primary winding of a transformer E whereof the secondary winding is shunted by a condenser E¹ of some .05 to .1 mfd. and a potentiometer E² to vary the amplitude of the trace on the oscillograph. These components act as a filter circuit to remove high frequency loops and peaks and thereby greatly assist in rendering the fault readily recognisable by characteristic traces. The potentiometer tapping is connected to one of the vertical plates F¹ of a cathode ray tube F whereof the other vertical plate F² as well as the anode F³ is connected to earth.

From a chosen one C¹ of the sparking plugs C a triggering impulse is tapped off to trigger the time base of the oscillograph. To prevent unduly reducing the spark impulse the connection is made through a high impedance such as the resistance G of some 5 megohms shown in Figure 1 or the small capacity G¹ of some 30 micro-microfarads shown in Figure 2. The triggering impulse is rectified in order that it may function whether the sparks at that particular plug are positive or negative. Any suitable form of rectifier may be used, that shown comprising a double diode triode H of the type shown as a 6Q7G.

The impulse from the sparking plug is fed to the primary winding of a transformer H¹ whereof the centre tapped secondary winding has its ends connected respectively to the diode anodes whilst the centre tapping is connected to the grid and through resistances also to the cathode thereby passing the rectified impulse to the grid.

The particular form of time base circuit per se forms no part of the present invention and any suitable known arrangement may be used for the purpose. It is therefore not thought necessary to do more than describe the main features of the particular arrangement shown in Figure 1.

The amplified impulse from the double diode triode H is passed to the grid of a grid controlled gas relay valve J of the type known as a G. T. I. C. and causes this valve to conduct provided the impulse is sufficiently in excess of the permanent grid bias on the gas relay valve. Across the anode circuit of this gas relay valve is a condenser J¹ of about .1 microfarad which is consequently discharged whereupon the fall of anode voltage causes the gas relay valve to become non-conductive again.

The condenser J¹ is connected across the high tension supply through a pentode K. The voltage variation across the condenser J¹ is applied to the horizontal deflector plates F⁴ and F⁵ of the cathode ray tube to form the time base, the voltage of the condenser during charging being proportional to time and the discharge through the gas valve providing the flash-back. A plain resistance could be used instead of the pentode K but in that case the deflection would not be linear with respect to time. The screen voltage of the pentode K is variable by means of a potentiometer K¹ to vary the time base.

The apparatus may be connected to any suitable source of power for example it may be built as a unit including batteries. In the arrangement shown, however, a power supply circuit is provided for supplying the various high tension and filament heating voltages from an input which may be either direct current from batteries, for example of 6, 12 or 24 volts, such as the supply on a vehicle or aircraft, or alternating current of any customary voltage from supply mains. In the case of battery input this energises a vibrator M to provide alternating current to a centre tapped primary winding N¹ on a power transformer N. The winding N¹ is provided with tappings which are selected in accordance with the battery voltage. The alternating current input, when used, is applied to another primary winding N² on the transformer N. A four pole selector switch P is provided to select the input. One pole P¹ either connects one pole of the alternating current supply or makes the circuit of the vibrator through a resistance appropriate to the voltage, two more poles P² and P³ connect opposite terminals of the vibrator to appropriate ends or tappings of the winding N¹ whilst the fourth pole P⁴ connects up the other pole of the alternating supply when in the appropriate position.

A switch Q is provided for interrupting one side of the high tension supply. This switch and the magneto selector switch D are shown as ganged together with a switch R connected to green and red lamps R¹ and R². The purpose of this is to provide a warning device to prevent the immediate application of the anode voltage to the gas relay valve before the filament is heated. The first step, in switching on, lights the green lamp and applies filament voltage to the valves. A lapse of at least half a minute is then allowed before switching on further and thereby lighting the red lamp and applying the anode voltage. This device may be dispensed with by putting a time delay switch in the anode circuit of the gas valve.

Figures 3 to 30 show diagrammatically various types of trace obtained and indicate roughly how these vary with different types of fault in the ignition system. Figures 3 to 16 are for a typical 12 volt 6 cylinder coil ignition system whilst Figures 17 to 30 are corresponding diagrams for a 12 cylinder 4 cam make-and-break type of magneto ignition.

Figure 3 shows the normal condition for the coil ignition. All the figures are of equal height, showing that plug gaps are all correctly adjusted. When viewing on the instrument the peaks of the figures will be seen to flicker slightly, due to variations between successive sparks.

Figure 4 shows certain plug defects, namely that No. 3 plug is open circuited whilst No. 4 plug is short circuited. It will be noted that the short circuited plug gives a figure which is shorter and wider than normal and does not exhibit flicker.

In Figure 5 plugs Nos. 3 and 4 are carboned up and misfiring. No. 3 is more heavily carboned up than No. 4. When viewing on the oscillograph screen it will be noted that plugs which are not firing give a steady figure, whereas plugs which are firing give a figure with a slight flicker in the peak.

Figure 6 shows the effect of badly adjusted plug gaps. No. 1 (triggering plug) is correct, No. 2 gap is too wide, No. 3 gap is too wide, though less so than No. 2, No. 4 is correct, No. 5 is too wide, and No. 6 is correct. All the plugs are firing.

Figure 7 illustrates the use of the variable shunt resistor E^x by which plugs which were previously firing can be made successively to fail. This renders possible estimation of the size of the plug gaps and the probability of misfiring.

The plugs are the same as in Figure 6 and one step of the shunt has been applied, thereby reducing the coil voltage. Plugs Nos. 2 and 3 are now misfiring. It will be noted that since plugs Nos. 2 and 3 are both misfiring, both figures are now the same height: both figures are now steady and have no spearhead tip: the base of the figure for each misfiring plug shows a double hump: and No. 5 plug, which also has a wide gap, is still firing.

Figure 8 applies to the same condition as Figure 7 but the voltage has been still further reduced by moving the shunt on another step. All three plugs with wide gaps are now misfiring and the figures are identical in shape. If more steps of the shunt were applied the remaining plugs, that is Nos. 1, 4 and 6, would eventually misfire. The last plug to misfire would be the plug with the smallest gap.

Figure 9 shows the effect of the H. T. coil being short-circuited or burnt out. This represents a case of complete failure. If the failure were casual or partial, the figure would alternate between that shown and the normal figure.

Figure 10 shows the effect of an open circuited condenser. The plugs are still firing in this case. The fault can be diagnosed by comparing the figure with the normal figure shown in Figure 3. It will be seen that whereas the normal spark figure has a thin line on the forward side and a thick line on the rear side, the figure with the faulty condenser shows a thick line on both sides. This is also visible in the triggering spark where the figure is spread out. The peaks and base lines of the figures are also different, and the variable height of the figures shows unsteady sparking.

Figure 11 shows the effect of a condenser partially short-circuited. All plugs are misfiring in this case. The diagnosis of the fault depends upon the characteristic shape of the figures and the fact that since all the plugs are misfiring uniformly, the fault must be located either in the coil or the distributor.

Figure 12 shows the effect of low battery voltage. Some of the plugs are misfiring in this case and if the figure were viewed on the instrument it would be seen that the misfiring is irregular. The diagram, being an instantaneous view of one engine cycle, does not show up this point. The figures are narrow and humps on the base are small due to the low energy available.

Figures 13, 14 and 15 show the effect of adjustment of contact breaker gap. The amplitude control is turned to maximum in these figures because the effect of the contact breaker gap opening is seen in the base line. Figure 13 shows correct adjustment, Figure 14 shows the effect of a small gap and Figure 15 the effect of a large gap. All plugs are firing in every case. The diagnosis is fairly obvious by direct comparison of the three figures. It may be noted in the case of Figure 14 where the gap is too small the base peaks vary in height. This is due to slight irregularity in the cam contour which only shows up under this condition.

Figure 16 shows the effect of a weak contact breaker spring. In this case also the amplitude control was turned to maximum. Diagnosis of the fault can be made by comparing the figure with that of a normal contact breaker correctly set, as shown in Figure 13. The figure also flickers in a characteristic way when seen on the instrument, although the diagram, being that of a single sweep, does not show this effect.

In certain of the faults shown above the energy supplied to the triggering sparking plug may be insufficient to trigger the spot. In such cases the figure may either assume the form of a stationary vertical line, due to the flicker of the spot not traversing the screen, or the instrument may trigger itself, resulting in a steady procession of figures across the screen. The fault may usually be diagnosed directly from the figures seen, but in case of doubt the triggering plug should be changed and a second test made.

Figures 17 to 30 are diagrams of typical traces obtained with various faults on a magneto ignition system. In this case the sparks are alternately positive and negative and as it is a 12 cylinder system there are twelve of them.

Figure 17 shows the normal condition. All the figures are of equal height, showing that plug gaps are all correctly adjusted. When viewing on the instrument the peaks of the figures will be seen to flicker slightly, due to variations between successive sparks.

Figure 18 shows certain plug defects, namely that No. 4 plug is open circuited and No. 8 plug is short circuited. It will be noted that the short circuited plug gives a figure which is shorter and wider than normal and does not exhibit flicker.

In Figure 19 plugs Nos. 4 and 6 are carboned up and misfiring. No. 4 is more heavily carboned up than No. 6. When viewing on the oscillograph screen it will be noted that plugs which are not firing give a steady figure, whereas plugs which are firing give a figure with a slight flicker in the peak.

Figure 20 shows the effect of badly adjusted plug gaps. No. 6 plug gap is very wide, No. 8 plug gap also is wide, but less than No. 6, while No. 10 plug gap is very small. Other gaps are correct. All the plugs are firing and would exhibit the usual slight flicker in the peak. The very wide gap is obvious, but the medium wide gap and the small gap are not quite so clearly defined and their presence is brought out by the use of the shunt as illustrated in the next figure.

Figure 21 illustrates the use of shunt resistor $E^x$. The plugs are the same as in Figure 20 but one step of the shunt has been applied, thereby reducing the magneto voltage and causing No. 6 plug to misfire steadily and No. 8 plug to misfire occasionally. The figure for No. 6 plug is now steady with no spear point tip. That for No. 8 alternates between the two conditions.

In Figure 22 a further step of the shunt has been applied and both Nos. 6 and 8 are now misfiring steadily. Under these conditions both the figures are of equal height.

In Figure 23 the voltage has been still further reduced by moving the shunt on and all the plugs are now misfiring except No. 10 which is thereby made obvious. The fact that No. 10 is a small gap and not a short-circuited plug can be inferred when viewing the figure on the instrument from the fact that there is a slight flicker in the peak.

Figure 24 shows the effect of the H. T. coil being short circuited or burnt out. This represents a case of complete failure. If the failure were occasional or partial, the figure would alternate between that shown and the normal figure.

Figure 25 shows the effect of an open circuited condenser. The plugs are still firing in this case. The fault can be diagnosed by comparing the figure with the normal figure shown in Figure 17. It will be seen that whereas the normal spark figure has a thin line on the forward side and a thick line on the rear side, the figure with the faulty condenser shows a thick line on both sides. The peaks and base lines of the figures are also different, and the variable height of the figures shows unsteady sparking.

Figure 26 shows the effect of the contact breaker being stuck open. The distinctive shape of the figures makes the diagnosis of this fault quite easy. If the contact breaker were only sticking occasionally the figure would alternate between that shown and the normal figure.

Figures 27, 28 and 29 show the effect of the adjustment of contact breaker gap. The amplitude control is turned to maximum for these figures because the effect of the contact breaker gap is to be seen in the base line. Figure 27 shows correct adjustment, Figure 28 shows the effect of a small gap, and Figure 29 shows the effect of a large gap. All the plugs are firing in every case. Diagnosis is made by comparing the three figures.

Figure 30 shows the effect of a weak contact breaker spring. The figures are generally unsteady and if the spring is very weak or if the engine speed is increasing, there is a tendency for the figures to assume the shape associated with a contact breaker which is stuck open. Conversely a drop in speed would cause the figures to revert to a shape approaching that of the normal conditions shown in Figure 17.

In certain of the faults shown above the energy supplied to the triggering sparking plug may be insufficient to trigger the spot. In such cases the figure may either assume the form of a stationary vertical line, due to the flicker of the spot not traversing the screen, or the instrument may trigger itself, resulting in a steady procession of figures across the screen. The fault may usually be diagnosed directly from the figures seen, but in case of doubt the triggering plug should be changed and a second test made.

It will be appreciated that these diagrams are given merely by way of example to indicate the very great amount of information which the apparatus gives in diagnosing faults in ignition systems, and that when requiring only two electrical connections to the circuit in addition to an earth. Whatever the characteristic shapes of the traces may be a very little experience and observation will enable an unskilled operator to recognise those associated with particular faults.

What I claim as my invention and desire to secure by Letters Patent is:

1. Apparatus for testing the ignition systems of internal combustion engines including a cathode ray tube, a time base circuit for said tube, a circuit for triggering the time base by an electrical impulse corresponding to that supplied to one of the sparking plugs, rectifying means in the circuit of the triggering impulse for ensuring that the time base is triggered irrespective of the polarity of the triggering spark, and means for connecting the tube to the ignition apparatus so as to receive impulses and give indications representing the wave-form of the impulses delivered to the sparking plugs.

2. Apparatus for testing the ignition systems of internal combustion engines including a cathode ray tube, a time base circuit for said tube, means for synchronising the time base with the cycle of the engine, filtering means, and means for connecting the tube to the ignition apparatus through the filtering means so that it will receive impulses and give indications representing the wave-form of the impulses delivered to the sparking plugs with the high frequency loops filtered out.

3. Apparatus for testing the ignition systems of internal combustion engines including a cathode ray tube, a time base circuit for said tube, means for triggering the time base from an identifiable point in the cycle of the engine, and means for connecting the tube to the low tension or primary side of the ignition apparatus so as to receive impulses and give indications representing the wave-form of a succession of impulses delivered respectively to the several sparking plugs supplied by the ignition apparatus, and filtering means arranged to eliminate high frequencies from the cathode ray tube.

4. Apparatus for testing the ignition systems of internal combustion engines including a cathode ray tube, a time base circuit for said tube, means for triggering the time base from an identifiable point in the cycle of the engine, means for connecting the tube to the low tension or primary side of the ignition apparatus so as to receive impulses and give indications representing the wave-form of a succession of impulses delivered respectively to the several sparking plugs supplied by the ignition apparatus, and attenuating means for progressively reducing the intensity of the impulses delivered to the sparking plugs so as to cause them successively to fail to spark.

5. Apparatus for testing the ignition systems of internal combustion engines including a cathode ray tube, a time base circuit for said tube, means for triggering the time base from the circuit of one of the sparking plugs, means for connecting the tube to the low tension or primary side of the ignition apparatus so as to receive impulses and give indications representing the wave form of a succession of impulses delivered respectively to the several sparking plugs supplied by the ignition apparatus, filtering means for filtering out the loops due to high frequency oscillations in the ignition apparatus, and variable attenuating means arranged for progressively reducing the intensity of the impulses delivered to the sparking plugs so as to cause them successively to fail to spark.

6. In apparatus for testing the ignition systems of internal combustion engines and including a cathode ray tube, and means for triggering a time base circuit from an identified point in the cycle of the engine; circuit means for connecting the cathode ray tube with the primary of an ignition transformer including a variable attenuator arranged to be connected parallel with the said primary for progressively reducing the intensity of voltages induced in the secondary of such transformer.

FRANK RAYMOND FABER RAMSAY.

REFERENCES CITED

The following references are of record in the file of this patent:

UNITED STATES PATENTS

| Number | Name | Date |
|--------|------|------|
| 2,094,472 | Rohats | Sept. 28, 1937 |
| 2,100,702 | Schlesinger | Nov. 30, 1937 |
| 2,178,471 | De Bruin | Oct. 31, 1939 |
| 2,188,845 | Ramsay | Jan. 30, 1940 |
| 2,324,458 | Peters | July 13, 1943 |
| 2,355,363 | Christaldi | Aug. 8, 1944 |
| 2,366,355 | Roberts | Jan. 2, 1945 |
| 2,381,609 | McCoy | Aug. 7, 1945 |